United States Patent
Scherer et al.

(10) Patent No.: US 11,629,996 B2
(45) Date of Patent: *Apr. 18, 2023

(54) COMPACT HYPERSPECTRAL MID-INFRARED SPECTROMETER

(71) Applicant: California Institute of Technology, Pasadena, CA (US)

(72) Inventors: Axel Scherer, Barnard, VT (US); Taeyoon Jeon, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,575

(22) Filed: Feb. 18, 2022

(65) Prior Publication Data
US 2022/0170793 A1    Jun. 2, 2022

Related U.S. Application Data

(63) Continuation of application No. 16/782,674, filed on Feb. 5, 2020, now Pat. No. 11,287,322.
(Continued)

(51) Int. Cl.
| | |
|---|---|
| *G01J 3/28* | (2006.01) |
| *H04N 5/33* | (2023.01) |
| *G01J 3/02* | (2006.01) |

(52) U.S. Cl.
CPC ........... *G01J 3/2823* (2013.01); *G01J 3/0208* (2013.01); *G01J 3/0291* (2013.01); *H04N 5/33* (2013.01); *G01J 2003/2826* (2013.01)

(58) Field of Classification Search
CPC ...... G01J 3/2823; G01J 3/0208; G01J 3/0291; G01J 2003/2826; G01J 2003/1234; H04N 5/33
See application file for complete search history.

(56) References Cited

U.S. PATENT DOCUMENTS

| | | |
|---|---|---|
| 5,144,498 A | 9/1992 | Vincent |
| 5,550,373 A | 8/1996 | Cole et al. |

(Continued)

FOREIGN PATENT DOCUMENTS

| | | |
|---|---|---|
| WO | 1989/005465 | 6/1989 |
| WO | 02/24570 A1 | 3/2002 |

(Continued)

OTHER PUBLICATIONS

A. Piegari et al., "Thin-film graded optical filters for mini-spectrometers", "Proceedings of SPIE", Event: ROMOPTO 2006: Eighth Conference on Optics, 2006, Sibiu, Romania, Aug. 1, 2007, doi: 10.1117/12.756739, 8 pp., vol. 6785, https://www.spiedigitallibrary.org/conference-proceedings-of-spie.

(Continued)

*Primary Examiner* — Hwa Andrew Lee
(74) *Attorney, Agent, or Firm* — Kaplan Breyer Schwarz, LLP

(57) ABSTRACT

An infrared spectrometer for operation in the mid-infrared spectral range is presented, where the spectrometer includes a Bragg-mirror-based spectral filter that is operative for providing an interrogation signal whose spectral content is dispersed along a first direction at a filter aperture. The filter aperture is imaged through a sample by a thermal-imaging camera to create a focused image that is based on the interrogation signal and the absorption characteristics of the sample. As a result, embodiments in accordance with the present disclosure can be smaller, less complex, and less expensive than infrared spectrometers known in the prior art.

26 Claims, 8 Drawing Sheets

Related U.S. Application Data

(60) Provisional application No. 62/801,762, filed on Feb. 6, 2019.

(56) References Cited

U.S. PATENT DOCUMENTS

| | | | |
|---|---|---|---|
| 5,674,457 | A | 10/1997 | Williamsson et al. |
| 5,777,329 | A | 7/1998 | Westphal et al. |
| 5,801,057 | A | 9/1998 | Smart et al. |
| 5,818,588 | A | 10/1998 | Matsumoto et al. |
| 6,243,170 | B1 | 6/2001 | Ershov |
| 6,597,490 | B2 | 7/2003 | Tayebati |
| 6,785,002 | B2 | 8/2004 | Zarrabian et al. |
| 7,304,798 | B2 | 12/2007 | Izumi et al. |
| 7,817,281 | B2 | 10/2010 | Kiesel et al. |
| 8,174,394 | B2 | 5/2012 | Ridder et al. |
| 8,406,859 | B2 | 3/2013 | Zuzak et al. |
| 8,649,097 | B2 | 2/2014 | Mitamura |
| 8,854,624 | B2 | 10/2014 | Pervez et al. |
| 9,230,856 | B2 | 1/2016 | Yeh et al. |
| 9,268,144 | B2 | 2/2016 | Rissanen et al. |
| 9,638,913 | B2 | 5/2017 | Kamal et al. |
| 11,085,825 | B2 | 8/2021 | Medhat et al. |
| 2002/0033453 | A1 | 3/2002 | Sauer et al. |
| 2003/0171696 | A1 | 9/2003 | Dosmann |
| 2003/0212346 | A1 | 11/2003 | Yuzhakov et al. |
| 2004/0136076 | A1 | 7/2004 | Tayebati |
| 2006/0039009 | A1 | 2/2006 | Kiesel et al. |
| 2006/0144335 | A1 | 7/2006 | Lee et al. |
| 2006/0182659 | A1 | 8/2006 | Unlu et al. |
| 2007/0148760 | A1 | 6/2007 | Klesel et al. |
| 2008/0080034 | A1 | 4/2008 | Saadany et al. |
| 2008/0094620 | A1 | 4/2008 | Li et al. |
| 2010/0032298 | A1 | 2/2010 | Reel et al. |
| 2010/0097613 | A1 | 4/2010 | Saari |
| 2012/0122084 | A1 | 5/2012 | Wagner et al. |
| 2012/0307081 | A1 | 12/2012 | Dewald et al. |
| 2013/0235256 | A1 | 9/2013 | Kodama |
| 2014/0219886 | A1 | 8/2014 | Choi et al. |
| 2014/0253714 | A1 | 9/2014 | Weida et al. |
| 2014/0268127 | A1 | 9/2014 | Day |
| 2015/0136981 | A1 | 5/2015 | Kester et al. |
| 2015/0138533 | A1 | 5/2015 | Bolles et al. |
| 2015/0331109 | A1 | 11/2015 | Christensen et al. |
| 2016/0202178 | A1 | 7/2016 | Acosta et al. |
| 2020/0249091 | A1 | 8/2020 | Scherer et al. |

FOREIGN PATENT DOCUMENTS

| | | |
|---|---|---|
| WO | 2005/124951 A1 | 12/2005 |
| WO | 2009/039354 | 3/2009 |
| WO | 2015/003759 A1 | 1/2015 |
| WO | 2016/176735 A1 | 11/2016 |

OTHER PUBLICATIONS

Authorized Officer Blaine Copenheaver, International Search Report and Written Opinion dated Apr. 24, 2020 in PCT Patent Application No. PCT/US2020/016819.

Authorized Officer Lee W. Young, International Search Report and Written Opinion dated Aug. 27, 2018 in International PCT Application No. PCT/US2018/034710.

Authorized Officer: Sung Chui Kang, "International Search Report" issued in counterpart International Patent Application No. PCT/US2016/021629, dated Jun. 17, 2016, Publisher PCT, Published in: WO.

Ayerden et al., Compact gas cell integrated with a linear variable optical filter, Optics Express, pp. 2981-3002, vol. 24/Issue 3.

Dolgin et al., "New Technology Report: Micromachined Optical Systems", Jun. 13, 1994, Jet Propulsion Laboratory.

Dolgin et al., "New Technology Report: Micromachined Tunable Filters for Optical Applications", Jun. 1, 1994, Jet Propulsion Laboratory.

Ford et al., 'Interference-Based Micromechanical Spectral Equalizers', Oct. 16, 2003, IEEE JSTQE on Optical Microsystems, pp. 1-8.

Ghaderi et al., Vapour HF release of airgap-based UV-visible optical filters, (Copyrights) 2015 Published by Elsevier Ltd.; Procedia Engineering 120 (2015), pp. 816-819.

International Search Report and Written Opinion issued in PCT Patent Application No. PCT/US2020/059723 dated Feb. 2, 2021.

Jesse A. Frantz et al., "Chip-based nonmechanical beam steerer in the midwave infrared", "Journal of the Optical Society of America", Nov. 5, 2018, Optical Society of America, pp. C29-C37, vol. 35, No. 12.

Leonid M. Goldenberg et al., "Fast and simple fabrication of organic Bragg mirrors—application to plastic microchip lasers", "Laser Physics Letters", Apr. 10, 2013, Astro Ltd, doi:10.1088/1612-2011/10/5/055808, 8 pp., https://iopscience.iop.org/article/10.1088/1612-2011/10/5/055808.

Non-Final Office Action dated Sep. 10, 2021 for U.S. Appl. No. 16/782,674.

Non-Final Rejection received for U.S. Appl. No. 15/990,114, dated Apr. 18, 2019, 23 pages.

Notice of Allowance and Fees Due (PTOL-85) dated Jan. 13, 2022 for U.S. Appl. No. 16/782,674.

Notice of Allowance received for U.S. Appl. No. 15/990,114, dated Sep. 23, 2019, 7 pages.

Paola Lova, "Selective Polymer Distributed Bragg Reflector Vapor Sensors", "Polymers", Oct. 17, 2018, doi:10.3390/polym10101161, 9 pp.

Prott et al., 'Modeling of Ultrawidely Tunable Vertical Cavity Air-Gap Filters and VCSELs', Jun. 19, 2003, IEEE Journal of Selected Topics in Quantum Electronics;, pp. 918-928, vol. 9/ Issue No. 3.

Streubel et al., 'Fabrication of InP/air-gap distributed Bragg reflectors and microcavities', Feb. 1997; Elsevier Materials Science and Engineering: B, pp. 364-367, vol. 44 / Issues 1-3, https://doi.org/10.1016/S0921-5107(96)01743-6.

Ghaderi et al., 'Vapour HF release of airgap-based UV-visible optical filters', © 2015 Published by Elsevier Ltd.; Procedia Engineering 120 (2015), pp. 816-819.

Non-Final Rejection dated Dec. 10, 2021 for U.S. Appl. No. 17/093,211.

Notice of Allowance and Fees Due (PTOL-85) dated Mar. 11, 2022 for U.S. Appl. No. 17/093,211.

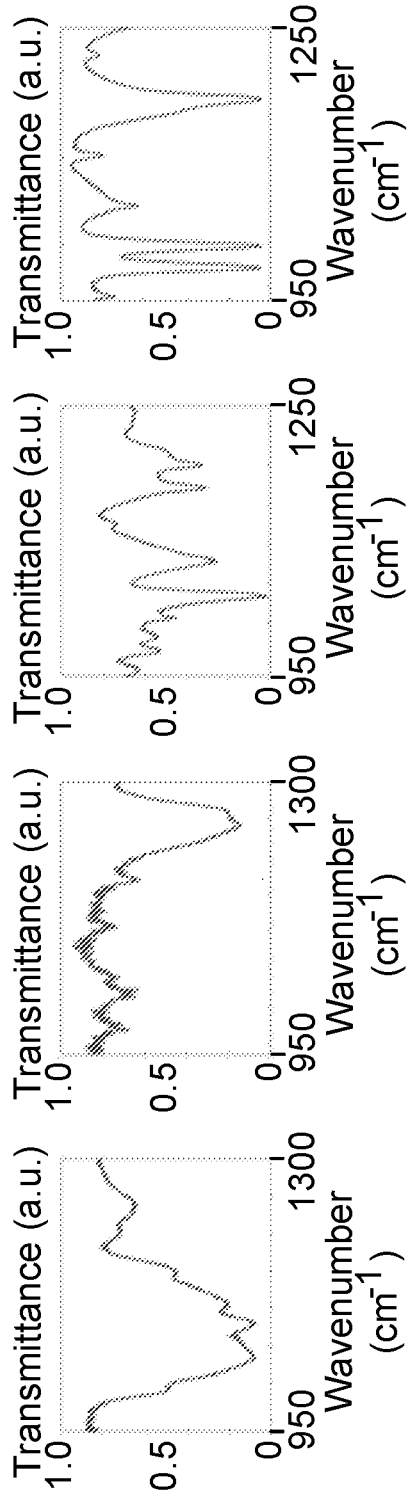
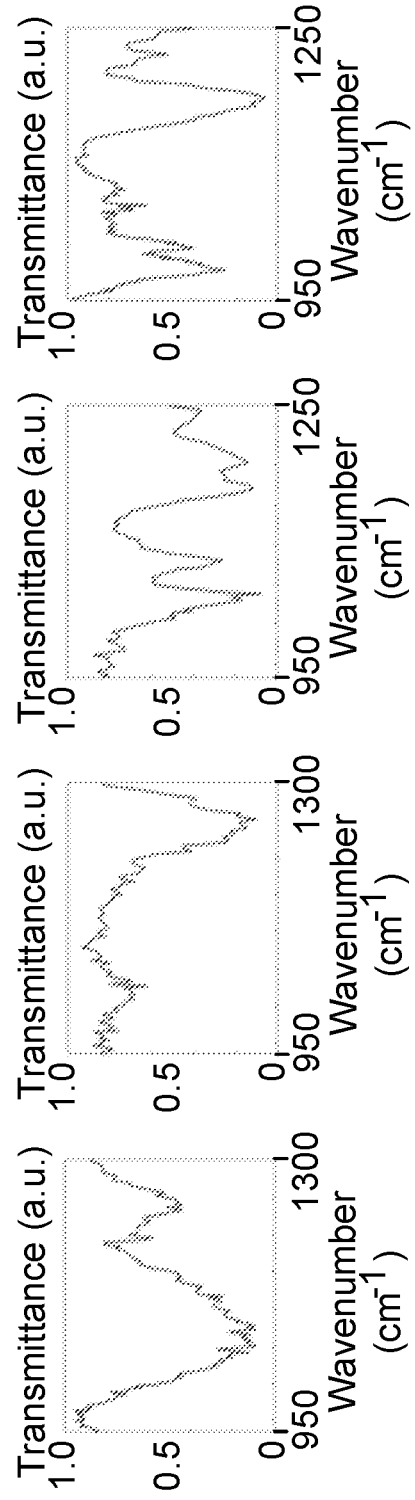
FIG. 9A FIG. 9B FIG. 9C FIG. 9D
FIG. 9E FIG. 9F FIG. 9G FIG. 9H

COMPACT HYPERSPECTRAL MID-INFRARED SPECTROMETER

RELATED APPLICATIONS

This application is a continuation of U.S. Non-Provisional patent application Ser. No. 16/782,674, filed Feb. 5, 2020, which claims the benefit of U.S. Provisional Application No. 62/801,762 filed Feb. 6, 2019, each of which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to spectroscopy in general and, more particularly, to hyperspectral spectrometers for use in the mid-infrared spectrum.

BACKGROUND OF THE INVENTION

Infrared spectroscopy enables analysis of the chemical composition of a sample by interrogating the material with light (or, alternatively, radiation) within a spectral range and determining the absorption spectrum of the sample material. Infrared spectroscopy is widely used in many applications, such as medical diagnostics, petroleum exploration, environmental monitoring, and drug testing.

Every chemical and compound has a unique absorption spectrum, which manifests as a specific set of wavelengths at which light is measurably absorbed. As a result, the "absorption peaks" identified for the material of a sample provide a chemical "finger print" that enables its chemical composition to be determined. The mid-infrared (MIR) spectral range (i.e., the wavelength range from approximately 5 microns to 25 microns) is particularly attractive for spectroscopy because it normally includes a wealth of absorption peaks for most chemicals; therefore, the MIR spectral range is often referred to as the "fingerprint region" for most molecules.

Prior-art spectrometers are typically based on Fourier Transform Infrared (FTIR) spectroscopy. Unfortunately, FTIR spectrometry requires large, highly complex interferometers having long optical paths and optical components, such as mirrors and beam splitters, whose alignment must be precisely maintained. As a result, such systems are large, complex, and expensive to manufacture and maintain over their lifetime.

Although there have been attempts to miniaturize FTIR spectroscopy systems for operation in the MIR spectral range, such systems still require the fabrication and alignment of a number of precisely controlled structures. Furthermore, they require that the sample be located very close to the sensor surface. As a result, prior-art miniaturized FTIR spectroscopy systems are not well suited for use in many applications, such as point of care health monitoring, pollution investigation and pharmaceutical testing.

Furthermore, operation in the MIR spectral range gives rise to additional challenges due to the fact that the set of materials suitable for use in optical components operable at MIR wavelengths is limited and such materials are often prohibitively expensive.

As a result, to date, conventional infrared spectrometers for operation in the MIR spectral range remain quite large and complex and, typically, suffer from narrow bandwidth or wavelength resolution that is too coarse to effectively identify many chemicals and compounds.

The need for a small, low-cost spectrometer capable of performing a high-quality chemical and/or molecular analysis of a sample remains, as yet, unmet in the prior art.

SUMMARY

An advance is made in the art according to aspects of the present disclosure directed to infrared spectrometers that include a thermal imaging camera and a spectral filter having a filter aperture at which a portion of a source signal is provided as an interrogation signal containing a plurality of wavelength signals. The camera images the filter aperture through the sample and focuses an image of the filter aperture at a focal-plane array that comprises a plurality of detector elements. The absorption characteristics of the sample are determined from output signal from the camera and used to estimate the chemical composition of the sample. Embodiments of the present invention are particularly well suited for use in hyperspectral imaging spectrometers, hyperspectral detection spectrometers, and high-resolution spectrometers.

Like the prior art, a spectrometer in accordance with the present disclosure employs a spectral filter comprising a Fabry-Perot (FP) cavity having a pair of Bragg-reflector-based mirrors, where the separation between the mirrors changes linearly along a first direction to give rise to a cavity length that varies linearly along that direction. A source signal is filtered by the spectral filter to realize an interrogation signal whose spectral content includes wavelength signals that are dispersed along the first direction at a filter aperture of the spectral filter. This interrogation signal propagates through the sample and the absorption characteristics of the sample are then determined.

In contrast to prior-art spectrometers, embodiments in accordance with the present disclosure employ a compact thermal imaging camera comprising a focusing lens and a focal-plane array to image the filter aperture through the sample and focus an image of the filter aperture onto its focal-plane array. The resultant image includes the plurality of wavelength signals, as impacted by absorption in the sample, and each wavelength signal is detected at a different detector element of the focal-plane array. By imaging the filter aperture through the sample using a compact thermal imager, spectrometers in accordance with the present disclosure can be more compact and lower cost than prior-art spectrometers. In addition, by locating the filter aperture such that its image is focus at the detector elements, the divergence of the light in the interrogation signal is reduced, thereby reducing the spectral range that surrounds the center wavelength of each wavelength signal. Furthermore, the readout rate of the infrared imaging camera is fast enough to enable spectral acquisition times of one second or less.

An illustrative embodiment is a mid-infrared spectrometer for analyzing a sample, where the spectrometer includes a blackbody radiation source for providing a source signal that includes a plurality of wavelength signals, a spectral filter that filters the source signal to provide an interrogation signal such that the wavelength signals are dispersed along a first direction at a filter aperture, and a thermal-imaging camera comprising an imaging lens and focal-plane array comprising a plurality of detector elements. The camera images the filter aperture through the sample to form an image that is focused on the detector elements such that each detector element receives a different wavelength signal. The detector elements are then read out as an output signal that is used by a processor to estimate the chemical composition of the sample.

The spectral filter is a Bragg-mirror-based Fabry-Perot cavity whose mirrors include alternating layers of silicon and air. The mirrors are separated by a linearly increasing distance along a first axis that is aligned with the row-direction of the focal-plane array. In some embodiments, the first axis is slightly misaligned with the row direction of the focal-plane array to enable finer spectral resolution. In some embodiments, the mirrors include alternating layers of different high-index and/or low-index materials, such as other semiconductors (e.g., germanium, gallium arsenide, etc.), and the like.

In addition, the spectral filter is configured such that the spectral range of the interrogation signal is limited such that only one wavelength signal is passed at each location along the first axis. In some embodiments, the spectral filter limits the spectral range of the interrogation signal to a narrower spectral range than the operational range of the detector elements.

In some embodiments, the operating spectral range is other than the MIR spectral range, such as the long-wavelength infrared spectral range, the near infrared spectral range, the visible spectral range, or a different spectral range.

In some embodiments, the spectral filter is configured to reduce the dispersion angle of the wavelength signals in the source signal as it provides the interrogation signal; therefore, at least some of the wavelength signals received at the detector elements include a narrower range of wavelengths that surround their center wavelength. Furthermore, the divergence of the wavelength signals is also reduced by the fact that the spectral filter is positioned such that its image is in focus on the detector arrays.

An embodiment in accordance with the present disclosure is a spectrometer (100) for analyzing a sample (110), the spectrometer comprising: a source (102) that provides a source signal (112) having a first spectral range (SR1) that includes a plurality of wavelength signals (λ1-λn), wherein each wavelength signal of the plurality thereof is characterized by a different wavelength; a spectral filter (104) that receives the source signal at a first surface (116-1) and provides at least a portion of the source signal as an interrogation signal (114) at a filter aperture (118) included in a second surface (116-2), wherein the interrogation signal has a second spectral range (SR2) that includes the plurality of wavelength signals, and wherein the plurality of wavelength signals is dispersed along a first direction at the filter aperture; and a camera (106) that includes a lens (124) and a plurality of detector elements (130), wherein the camera is operative for providing an output signal (132) based on light incident on the plurality of detector elements; wherein the camera and spectral filter are arranged such that the camera images the filter aperture through the sample and forms an image (118') of the filter aperture that is focused on the plurality of detector elements such that each detector element receives a different image-portion of the image.

Another embodiment in accordance with the present disclosure is a spectrometer (100) for analyzing a sample (110), the spectrometer comprising: a source (102) that provides a source signal (112) having a first spectral range (SR1) that includes a plurality of wavelength signals (λ1-λn), wherein each wavelength signal of the plurality thereof is characterized by a different wavelength; a spectral filter (104) that receives the source signal at a first surface (116-1) and provides at least a portion of the source signal as an interrogation signal (114) at a filter aperture (118) included in a second surface (116-2), the interrogation signal having a second spectral range (SR2) that includes the plurality of wavelength signals, wherein the plurality of wavelength signals is dispersed along a first direction at the filter aperture; and a camera (106) that includes a plurality of detector elements (130) and a lens (124) having a focal length (f1) that defines an object distance (128), wherein the camera is operative for providing an output signal (132) based on light incident on the plurality of detector elements; wherein the camera and spectral filter are arranged such that the filter aperture is located at the object distance, and wherein the sample is between the lens and the spectral filter.

Yet another embodiment in accordance with the present disclosure is a method for analyzing a sample (110), the method including: providing an interrogation signal (114) at a filter aperture (118) of a spectral filter (104), wherein the interrogation signal includes a plurality of wavelength signals (λ1-λn) that are dispersed along a first direction at the filter aperture; imaging the spectral filter through the sample to form an image (118') that is focused at a focal-plane array (122) comprising a plurality of detector elements (130), wherein the image is based on the interrogation signal and an absorption spectrum of the sample, and wherein each detector element receives a different image-portion of the image and provides a detector output that is based on the intensity of the image-portion it receives; and providing an output signal (132) that includes the plurality of detector outputs.

BRIEF DESCRIPTION OF THE DRAWINGS

FIGS. 9A-H depict comparisons of transmission spectra for different sample materials as measured by a conventional FTIR system and a spectrometer in accordance with the present disclosure.

DETAILED DESCRIPTION

Figure 1:
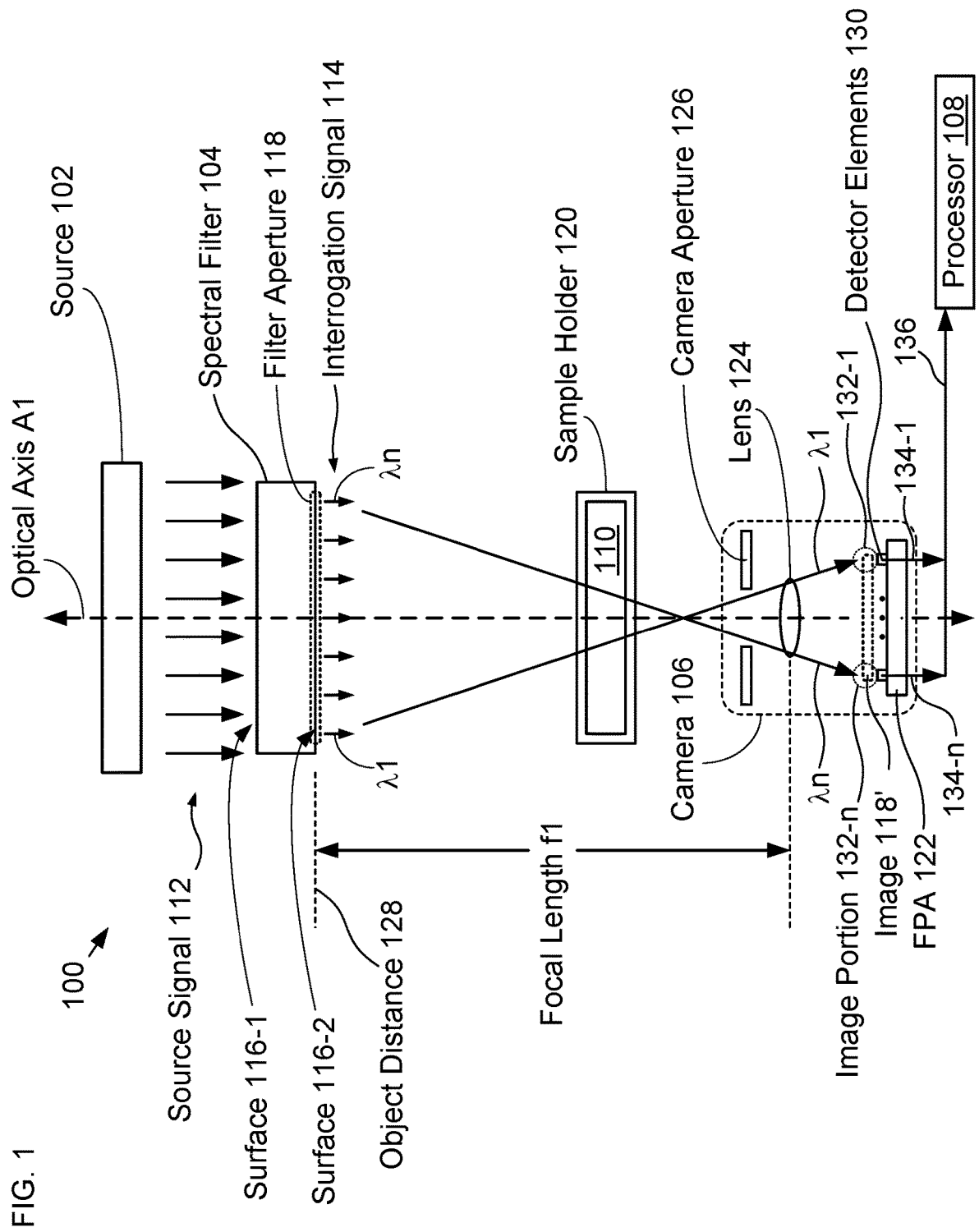
FIG. 1 depicts a schematic drawing of schematic drawing of an illustrative embodiment of an MIR spectrometer in accordance with the present disclosure.

FIG. 1 depicts a schematic drawing of schematic drawing of an illustrative embodiment of an MIR spectrometer in accordance with the present disclosure. Spectrometer 100 includes source 102, spectral filter 104, camera 106, and processor 108, where source 102, spectral filter 104, and camera 106 are aligned along optical axis A1, which passes through sample 110.

Figure 2:
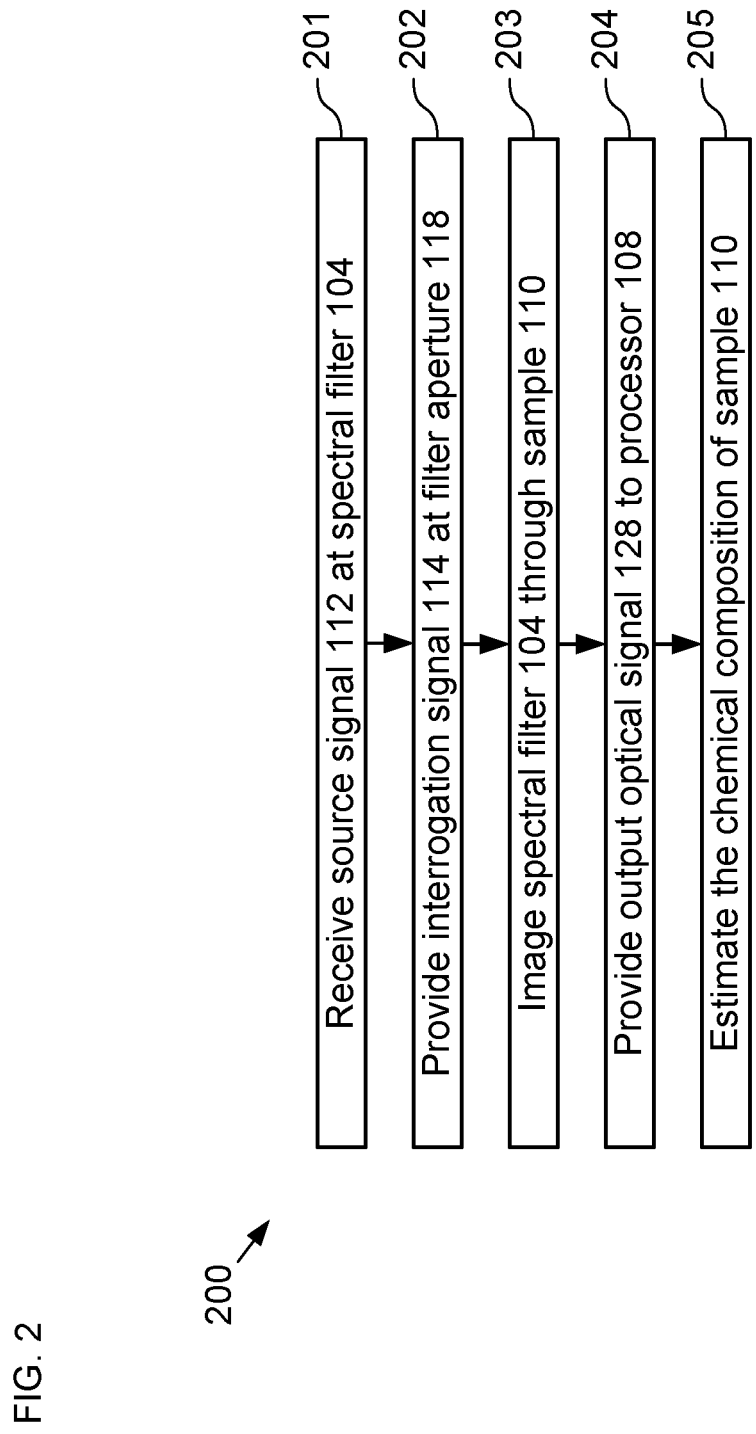
FIG. 2 depicts operations of a method for performing mid-infrared spectroscopy in accordance with the illustrative embodiment.

FIG. 2 depicts operations of a method for performing MIR spectroscopy in accordance with the illustrative embodiment. Method 200 is described herein with continuing reference to FIG. 1, as well as reference to FIGS. 3-4A-B. Method 200 begins with operation 201, wherein spectral filter 104 receives source signal 112 from source 102.

Source 102 is a conventional broadband blackbody light source that provides source signal 112. In the depicted example, source signal 112 is has a continuous spectral range having spectral width, SR1, which extends from $\lambda min$ to $\lambda max$ with center wavelength $\lambda c1$. In the depicted example, SR1 extends from $\lambda min$ of approximately 2 microns to $\lambda max$ of approximately 20 microns.

At operation 202, spectral filter 104 provides interrogation signal 114 based on source signal 112.

Spectral filter 104 is a Bragg-mirror-based Fabry-Perot (FP) cavity filter having outer surfaces 116-1 and 116-2, where a portion of surface 116-2 defines filter aperture 118. Spectral filter 104 is configured to receive source signal 112 at surface 116-1 and pass a portion of the source signal to filter aperture 118 as interrogation signal 114 such that the interrogation signal includes wavelength signals $\lambda 1$ through $\lambda n$, which are dispersed along the x-direction at the filter aperture. For the purposes of this Specification, including the appended claims, the term "wavelength signal" is defined as light signal whose spectral content is characterized by a center wavelength and a narrow spectral range that surrounds it.

As will be apparent to one skilled in the art, the size of a spectrometer is dictated by the required propagation length of light within it. Typical prior-art spectrometers require long propagation lengths, which limits their miniaturization. Furthermore, long propagation lengths require precisely aligned optical elements, such as mirrors and beam splitters, which adds to their complexity and manufacturing costs. In addition, these optical components must be kept carefully aligned throughout the operational lifetime of a system, which increases operating expense as well.

By configuring spectral filter 104 as an FP-cavity-based spectral filter, however, embodiments in accordance with the present disclosure have greater potential for miniaturization, as well as reduced complexity as comparted to conventional spectrometers. These advantages arise, in part, from the fact that an FP cavity is an optically resonant cavity in which light at the resonant frequency of the cavity is reflected back and forth many times, thereby multiplying the path-length of the photons in the light by the number of roundtrips they take within the cavity.

Figure 3:
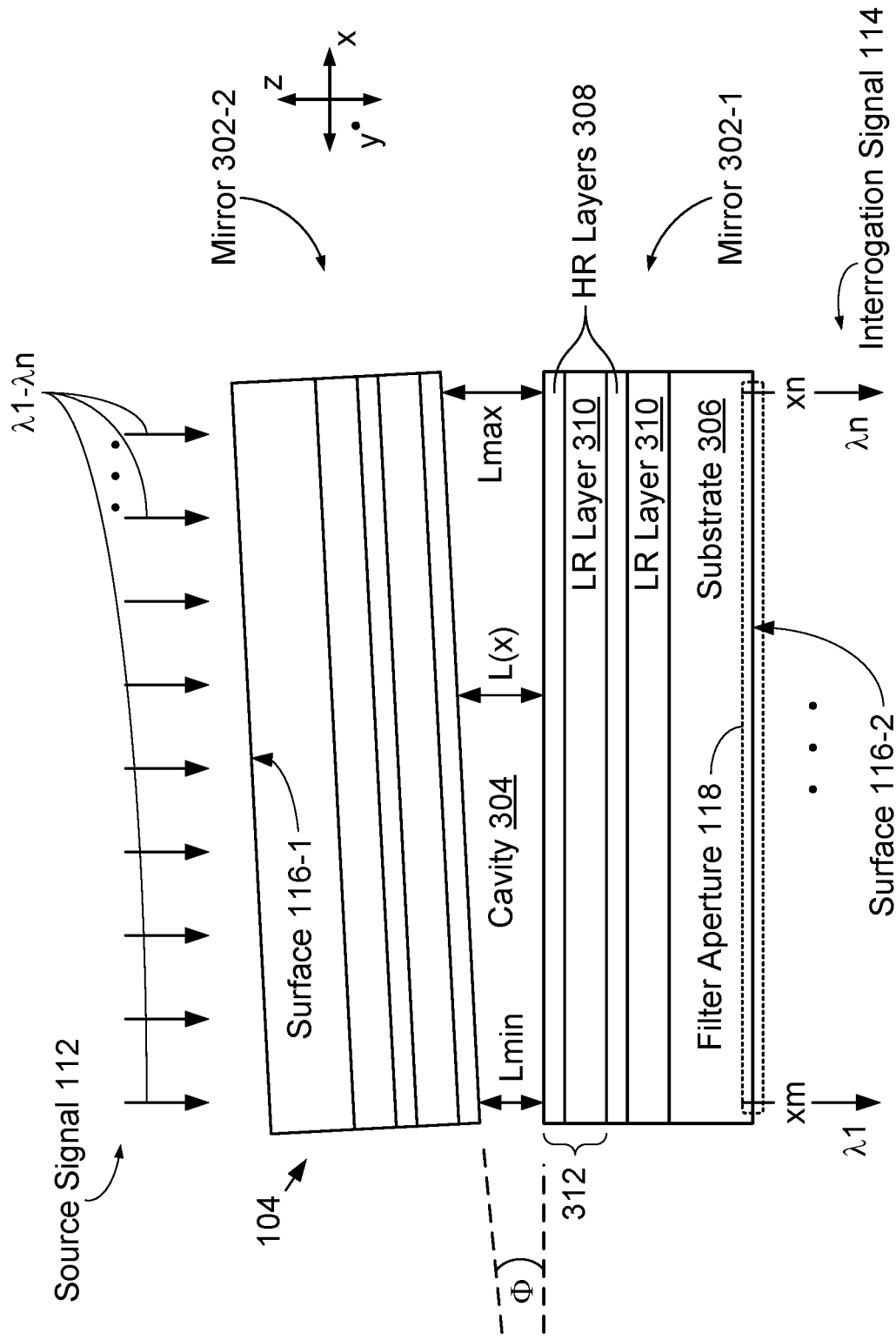
FIG. 3 depicts a schematic drawing of a cross-sectional view of a spectral filter in accordance with the present disclosure.

FIG. 3 depicts a schematic drawing of a cross-sectional view of a spectral filter in accordance with the present disclosure. Spectral filter 104 includes substantially identical mirrors 302-1 and 302-2, which are separated by a small, non-uniform separation that defines optical cavity 304 (hereinafter referred to as "cavity 304").

Each of mirrors 302-1 and 302-2 (referred to, collectively, as mirrors 302) is a multilayer Bragg reflector designed to realize high-reflectivity (>99.9999%) over the extent of the spectral range, SR2, of interrogation signal 114. Each of mirrors 302 includes at least one Bragg-layer-pair 312 disposed on a surface of a substrate 306, where Bragg-layer-pair 312 includes one high-refractive-index (HR) layer 308 and one low-refractive-index (LR) layer 310.

HR layer 308 comprises material having a relatively higher refractive index and has a thickness substantially equal to an odd multiple of one-quarter of a target wavelength, $\lambda t$, within spectral range SR2 (i.e., $k\lambda t/4$, where k=1, 3, 5, ... ) as measured within its material. In similar fashion, LR layer 310 comprises relatively lower refractive-index material and has a thickness substantially equal to an odd multiple of one-quarter of a target wavelength, $\lambda t$, within its material. It should be noted that the target wavelength is a matter of design choice and is selected to enable operation of spectral filter 104; therefore, $\lambda t$ can be virtually any wavelength within spectral range SR2. Preferably, however, target wavelength, $\lambda t$, has a value that is equal to, or nearly equal to, the center wavelength of this spectral range. In the depicted example, $\lambda t$ is selected as approximately 9 microns.

In the depicted example, substrate 306 is a conventional single-crystal-silicon substrate and each mirror includes two Bragg-layer-pairs, each having one HR layer 308 and one LR layer 310. HR layer 308 is a layer of amorphous silicon deposited using plasma-enhanced chemical-vapor deposition (PECVD) such that the amorphous silicon has a refractive index of approximately 2.8 and a thickness of approximately 803 nm. LR layer 310 is a layer of air having a thickness of approximately 2.25 microns. It should be noted that the materials and design parameters provided for mirrors 302 are merely exemplary and that myriad alternative designs for the mirrors of spectral filter 104 are within the scope of the present disclosure. However, embodiments comprising Bragg mirrors made of alternating layers of silicon and air are afforded significant advantages over the prior art because the fabrication of silicon layers is a well-known and well-understood process and can be done at low cost. Furthermore, the mechanical and optical properties of silicon are well suited to their use in mirrors 302.

The separation between mirrors 302 (i.e., the cavity length of cavity 304) at any point, dictates what wavelengths pass through spectral filter 104 at that point and what wavelengths are reflected by the spectral filter. Light having wavelength $\lambda$ resonates back and forth between the mirrors inside an optically resonant cavity when the spacing between them (i.e., the cavity length, L) is equal to an integer number, m, of half-wavelengths (i.e., when $L=m\lambda/2$). As a result, the light having wavelength $\lambda$ is transmitted through the cavity with low loss while light characterized by other wavelengths is reflected by the FP cavity. The cavity length, therefore, dictates the wavelength of light selectively passed by the FP cavity.

Mirrors 302-1 and 302-2 are arranged at non-zero angle, (D, to one another along the x-direction such that the cavity length of cavity 304 changes linearly along the x-direction. As a result, at each location, x, mirrors 302-1 and 302-2 are separated by cavity length L(x), which increases from Lmin at location xm to Lmax at location xn. In the depicted example, Lmin is approximately 3.28 microns and Lmax is approximately 7.05 microns. In some embodiments, the cavity length decreases linearly along the x-direction. In some embodiments, the spacing and/or angle between mirrors 302 is controllable.

The linearly increasing cavity length of spectral filter 104 enables it to, at each location x, receive source signal 112 as a multispectral input optical signal and selectively pass a narrow transmission peak (i.e., one wavelength signal) within spectral range SR2. In other words, at each location along the x-direction, spectral filter 104 selectively passes a different wavelength signal λi, where m≤i≤n such that its spectral content is dispersed along the x-direction from λ1 at location xm to λn at location xn. In the depicted example, λ1 is approximately 7.5 microns, λn is approximately 12 microns.

Figure 4B:
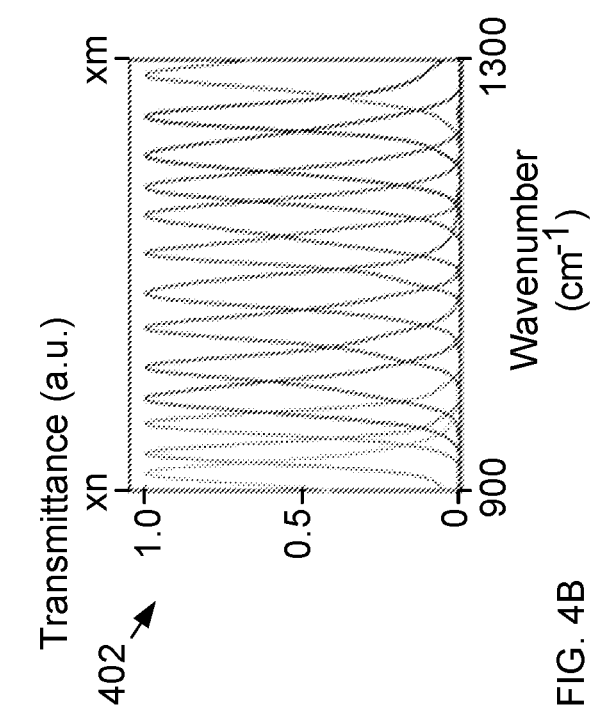
FIG. 4B depicts measured transmittance spectra as a function of location across the width of a spectral filter in accordance with the present disclosure.
Figure 4A:
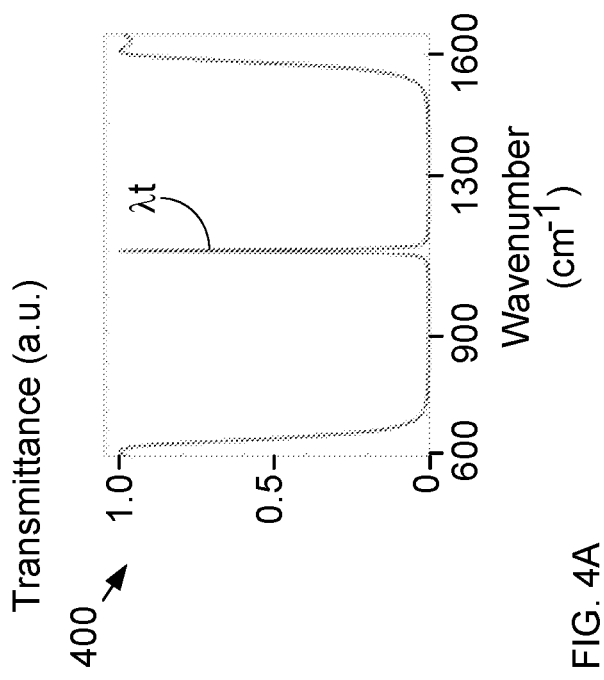
FIG. 4A depicts the simulated transmittance spectrum of spectral filter 104.

FIG. 4A depicts the simulated transmittance spectrum of spectral filter 104. Plot 400 shows that, for a cavity length equal to half of target wavelength, λt, (i.e., a cavity length of 4.5 microns in the depicted example), a single narrow wavelength signal corresponding to λt is passed by the spectral filter.

FIG. 4B depicts measured transmittance spectra as a function of location across the width of a spectral filter in accordance with the present disclosure. Plot 402 shows that, at location x, a single wavelength signal is passed by spectral filter 104. It should be noted, however, that the transmission spectra shown in plot 402 were taken using an FTIR spectrometer having an aperture of millimeter scale. As a result, the peaks in the measured spectra are artificially broadened due to the cavity-thickness variation within the millimeter aperture area in each measurement.

In some embodiments, mirrors 302 are arranged at a second angle to one another along the y-direction, such that the cavity length of cavity 304 also has a linear gradient along the y-direction. In such embodiments, spectral filter is configured to disperse the spectral content of interrogation signal 114 along each of the x- and y-directions.

Returning now to method 200, at operation 203, camera 106 images filter aperture 118 through sample 110 and sample holder 120 to form image 118' on focal-plane array (FPA) 122.

Camera 106 is a thermal-imaging camera comprising FPA 122, lens 124, and camera aperture 126. In some embodiments, camera 106 is a different camera operative for imaging filter aperture 118.

FPA 122 comprises a two-dimensional array of substantially identical detector elements 130-1 through 130-n (referred to, collectively, as detector elements 130), each of which is suitable for detecting light within spectral range SR2. In the depicted example, each of the detector elements 130 is a bolometer configured to enable detection of light within the wavelength range from approximately 7.5 microns to approximately 13.5 microns.

It is an aspect of the present disclosure that operation within the wavelength range from approximately 7.5 microns to approximately 13.5 microns corresponds to an atmospheric transparency window and transmission passband in the infrared spectral range. As a result, only light corresponding to the specific wavelength passed by spectral filter 104 reaches its corresponding detector element 130. Therefore, embodiments in accordance with the present disclosure do not require additional optical filters, such as those needed in prior-art infrared spectrometers, which enables such embodiments to have lower complexity and/or cost.

In some embodiments, FPA 122 includes a different suitable light detector. Alternative light detectors suitable for use in FPA 122 include, without limitation, semiconductor detectors, mercury-cadmium-telluride detectors, and the like.

Lens 124 is an imaging lens suitable for operation over spectral range SR2. Lens 124 is configured to form image 118' of the filter aperture of spectral filter 104 on FPA 122. Lens 124 has focal length f1 and object distance 128, which defines a separation between spectral filter 104 and lens 122 that enables the lens to form a focused image of the spectral filter on FPA 122. As will be apparent to one skilled in the art, after reading this Specification, lens 124 can include any lens design or configuration (e.g., multi-element, compound, telescope, diffractive, refractive, etc.) that enables it to form a focused image of spectral filter 106 on FPA 122.

In the depicted example, the focal length, f1, of lens 124 is approximately 6.35 cm. By employing a lens with a short focal length, spectrometer 100 can made compact without the need to include additional optical components, such as beam splitters, mirrors and lasers for beam collimation. As a result, spectrometers in accordance with the present disclosure can be significantly smaller and have lower complexity than prior-art spectrometers. For instance, in the depicted example, spectrometer 100 has a total length along the y-direction of only approximately 10 cm, without requiring the optical path from source 102 to FPA 122 to be folded.

Camera aperture 126 is a clear aperture that is optionally included in camera 106 to function as a camera "stop" that reduces the divergence angle of light received at some or all of detector elements 130.

Spectrometer 100 is arranged such that filter aperture 118 is located at object distance, 128, which is defined by the focal length, f1, of lens 124 as it images the filter aperture through sample 110 and sample holder SH. As a result, camera 106 focuses the filter aperture on FPA 122 to form image 118'. In some embodiments, spectrometer 100 is arranged such that a different plane within spectral filter 104 is located at focal length f1.

It should be noted that, although detector elements 130 can detect light having any wavelength within the range from approximately 7.5 microns to approximately 13.5 microns, one or more higher-order resonance peaks exist at wavelengths greater than 12 microns, which could give rise to interference in spectrometer 100. As a result, the spectral range, SR2, of spectral filter 104 is capped at a maximum wavelength signal, λn, of 12 microns, thereby limiting the measurement range for spectrometer 100 to at or below 12 microns.

Image 118' is a convolution of the dispersed spectral content of interrogation signal 114 and the absorption characteristics of sample 110. As a result, image 118' includes absorption peaks whose positions, magnitudes, and inflections provide a "spectral fingerprint" that is indicative of the chemical composition of sample 110.

Image 118' includes image-portions 132-1 through 132-n, which correspond to wavelength signals λ1 through λn, respectively.

At operation 204, detector elements 130 are readout by camera 106 and provided to processor 108 as output signal 132, which includes detector outputs 134-1 through 134-n.

Since the spectral content of interrogation signal 114 is dispersed along the x-direction at filter aperture 118, detector elements 130-1 through 130-n detect image-portions 132-1 through 132-n, respectively, and provide detector outputs 134-1 through 134-n. The magnitude of each of detector outputs 134-1 through 134-n is based on the intensity of the wavelength signal (i.e., image portion) incident upon its respective detector element. As discussed below, range of wavelengths that surround the center wavelength of each wavelength signal is a function of the optical design of spectrometer 100, the size of detector elements 130, the spacing between adjacent detector elements, and the angle of incidence for the light included in the wavelength signal.

It is another aspect of the present disclosure that, because the readout rate of a micro-bolometer array can be as fast as 9 Hz, embodiments in accordance with the present disclosure can obtain molecular absorption spectra for a sample in less than one second without the need for scanning optics that are typically necessary in the prior art.

At operation 205, processor 108 generates an estimate of the chemical composition of sample 110 based on output signal 132.

Processor 108 is a conventional processor comprising circuitry operative for receiving output signal 132, executing instructions, storing and retrieving data, and estimating the material composition of sample 110, among other functions.

It should be noted that, typically, method 200 is preceded by a calibration routine in which the optical transfer function of spectrometer 100 is determined by performing at least some of operations 201 through 205 with an empty sample holder SH. Such a calibration provides processor 108 a baseline against which output signal 132 can be compared to develop the estimation of the chemical composition of sample 110.

As will be appreciated by one skilled in the art, after reading this Specification, the transmittance of spectral filter 104 can be affected by the angle at which light is received from source 102; therefore, the wavelength of light illuminated onto each detector element 130 can be based on both cavity length and incident angle of the light received from the spectral filter.

It is an aspect of the present disclosure, however, that the range of wavelengths incident on at least some of detector elements 130 (i.e., the range of wavelengths that surround the center wavelength of at least some of the wavelength signals) can be reduced by:

i. focusing an image of filter aperture 118 on the detector elements of FPA 122; or
ii. providing spectral filter 104 such that it is configured to reduce the divergence angle of the wavelength signals; or
iii. a combination of i and ii.

Because filter aperture 118 is focused onto detector elements 130 of FPA 122, each of the detector elements receives a different wavelength signal corresponding to a different portion of cavity 304, where each portion of the cavity has a different cavity length. Furthermore, detector elements 130 are configured such that they are very small; therefore, the variation in the cavity length across the cavity portion from which each detector element receives light is substantially insignificant and is ignored for the purposes of the discussion provided herein.

It should be noted that the angular spread (i.e., divergence angle) of the propagation direction of photons arriving at detector element 130 is a function of the size of source 102, the size of lens 124, and the distance between the lens and spectral filter 104. As a light ray within source signal 112 is incident on spectral filter 104, the angle at which it propagates (relative to optical axis A1) is reduced by a factor based on the refractive-index difference at surface 116-1. By forming spectral filter such that it includes Bragg mirrors having high-refractive-index materials, light passing through the spectral filter is highly refracted. As a result, wavelength signals included in the light become more collimated as they transition from source signal 112 to interrogation signal 114, thereby reducing their divergence angle.

Figure 5:
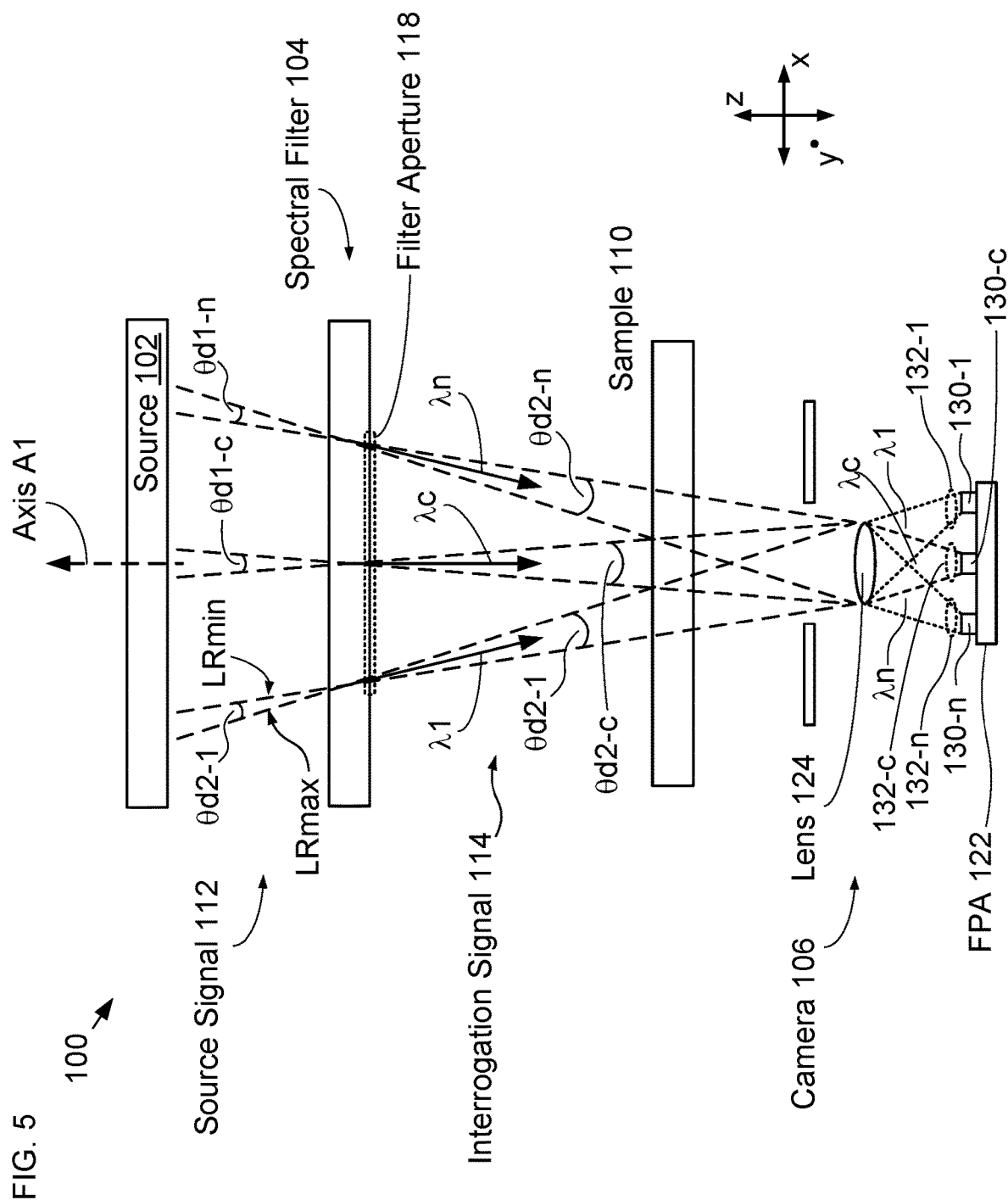
FIG. 5 depicts a schematic drawing of spectrometer 100 showing optical configuration of three representative wavelength signals as they propagate from source 102 to FPA 122.

FIG. 5 depicts a schematic drawing of spectrometer 100 showing optical configuration of three representative wavelength signals as they propagate from source 102 to FPA 122. FIG. 5 shows the paths and shapes of wavelength signals λ1 and λn, which are received at the outermost detector elements of FPA 122 (i.e., detector elements 130-1 and 130-n), as well as the central wavelength signal (i.e., wavelength signal λc), which is received at the center detector element of FPA 122 (i.e., detector element 130-c).

In source signal 112, waveguide signals λ1 through λn all have the same divergence angle. In other words, θd1-1, θd1-c, θd1-n all have the same value. In the depicted example, this value is approximately 5.4°, which gives rise to the incident angles for outermost rays within each of wavelength signals λ1 and λn, LRmin and LRmax, as 7.5° and 12.9°, respectively.

Figure 6:
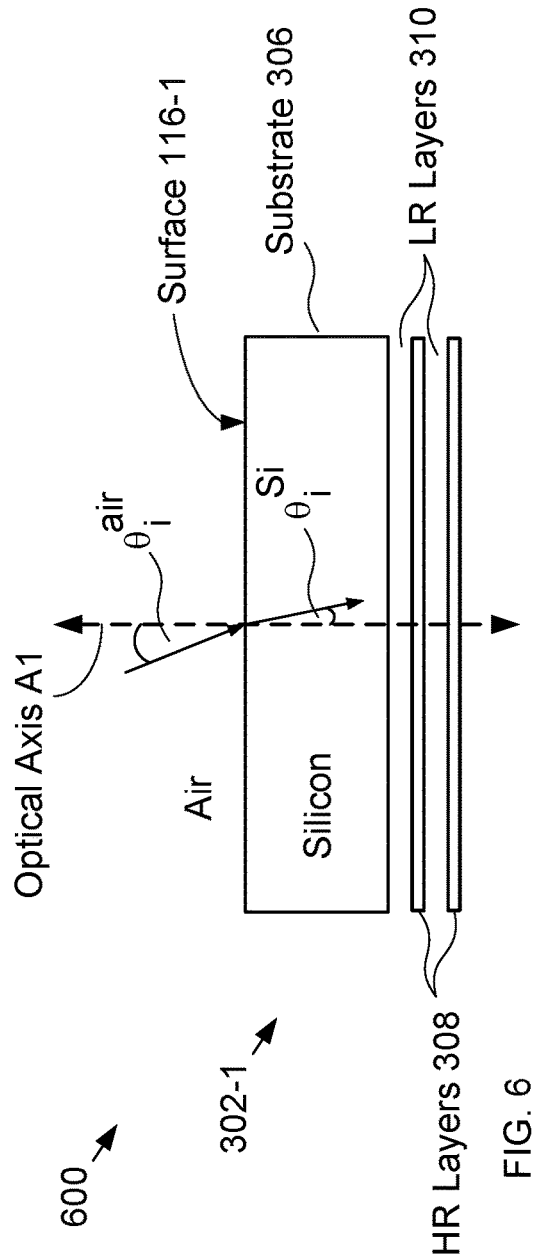
FIG. 6 depicts a schematic drawing of a cross-section of a portion of a spectral filter in accordance with the present disclosure.

FIG. 6 depicts a schematic drawing of a cross-section of a portion of a spectral filter in accordance with the present disclosure. Section 600 is a region of mirror 302-1, at which light ray LRmax in wavelength signal λ1 of source signal 112 is incident.

As indicted in FIG. 6, by virtue of the large change in refractive index between air and the material of substrate 306 (i.e., silicon), according to Snell's law, the angle, $\theta_i^{Air}$, at which a light ray propagates in air (relative to optical axis A1) is reduced at surface 116-1 by a factor based on this refractive-index difference to ($\theta_i^{Si}$) within substrate 306.

In the depicted example, air has a refractive index of 1.0, the silicon of substrate 306 has a refractive index of approximately 3.4, and each of HR layers 308 has a refractive index of 2.8. As discussed above, when LRmin and LRmax are received at surface 116-1, their incidence angles ($\theta_i^{Air}$) at surface 116-1 (i.e., 7.5° and 12.9°, respectively). When received at FPA 122 after passing through spectral filter 104, however, these incident angles are reduced to 2.67° and 4.57°, respectively. For an exemplary cavity length of 4.5 microns, a light ray incident on a detector element 130 at an angle ($\theta_i^{Si}$) of 4.57° gives rise to a wavelength shift of approximately 0.174 microns, as compared an incident angle of 0°.

Figure 7:
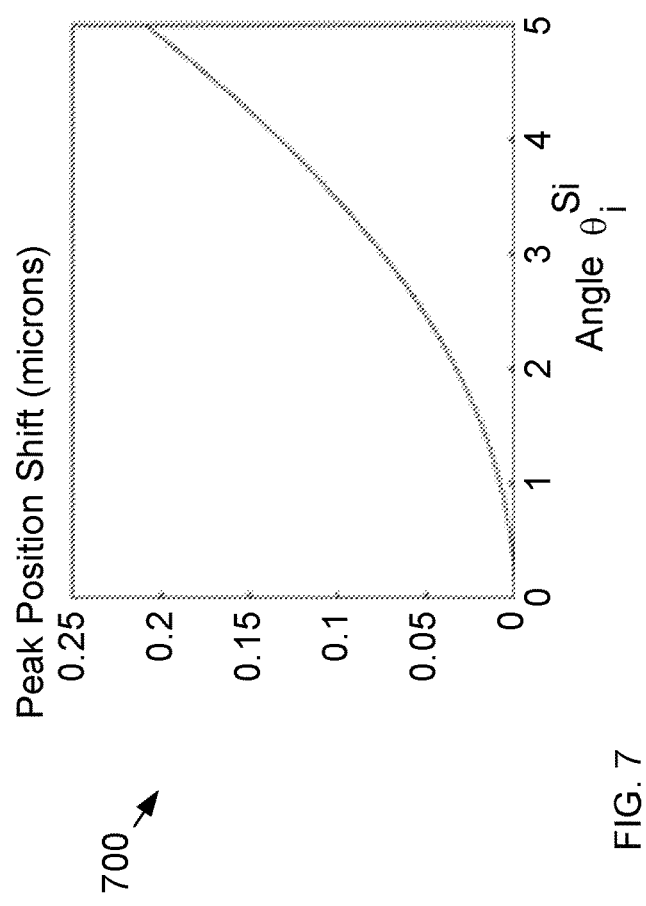
FIG. 7 depicts a plot of wavelength shift as a function of incident angle. Plot 700 shows the resonance-frequency position shift for incident angle ($\theta_i^{Si}$) as compared to an incident angle of zero degrees for a cavity length equal to 4.5 microns.

FIG. 7 depicts a plot of wavelength shift as a function of incident angle. Plot 700 shows the resonance-frequency position shift for the angle ($\theta_i^{Si}$) at which light propagates in substrate 306, as compared to light that is received normal to spectral filter 104, for a cavity length equal to 4.5 microns.

It should be noted, however, that the spectral range surrounding the center wavelength of the wavelength signal received at each detector element is a function of both the cavity length that passes a wavelength signal and the incident angles of its outermost light rays on the detector element.

Figure 8A:
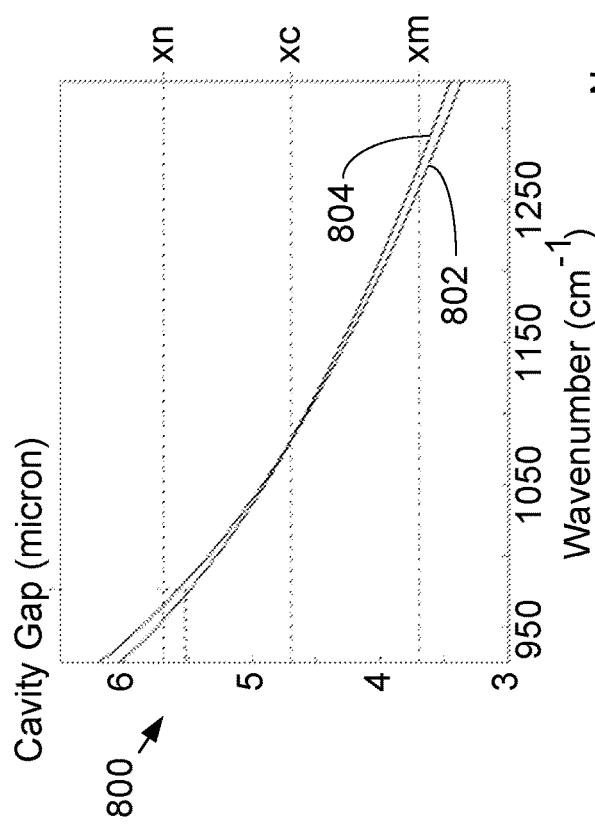
FIG. 8A depicts the transmittance of a spectral filter over a range of cavity lengths and incident angles in accordance with the present disclosure.

FIG. 8A depicts the transmittance of a spectral filter over a range of cavity lengths and incident angles in accordance with the present disclosure. Plot 800 includes traces 802 and 804, which denote the transmittance for the extreme outer rays within the dispersion angle of a wavelength signal.

It can be seen from plot 800 that the divergence of the transmittance of spectral filter 104 is greatest at each end of cavity 304, while its divergence at the center of the cavity is very small, since light rays passing through this point is substantially aligned with the center of lens 126. The larger divergence at the extreme ends of spectral cavity 104 arises because the light passes off-center through the spectral filter giving rise to a larger incidence angle for the same divergence angle.

Figure 8B:
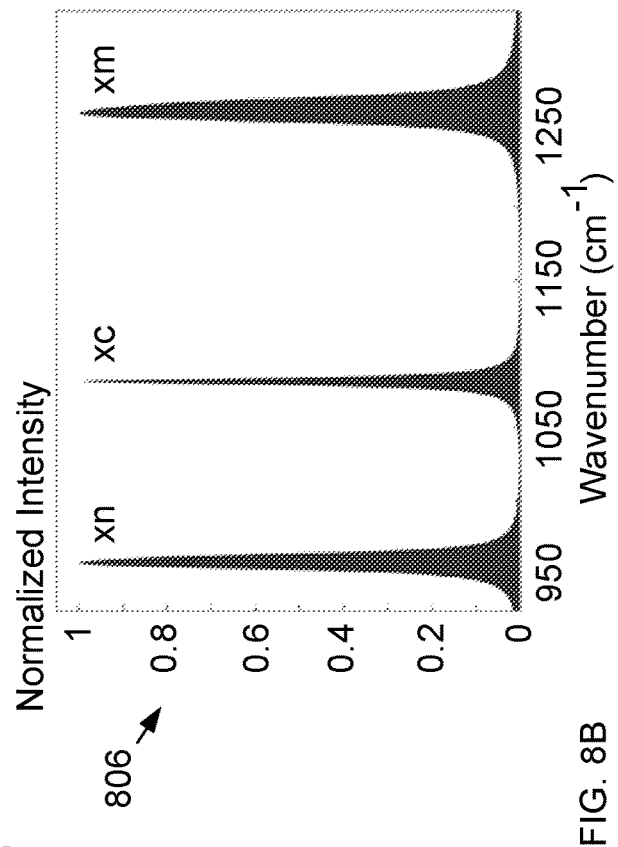
FIG. 8B depicts the total transmittance of spectral filter 104 at three different positions along the x-direction.

FIG. 8B depicts the total transmittance of spectral filter 104 at three different positions along the x-direction. The spectra shown in plot 806 were obtained from the integration of all divergence angles at positions along the x-direction located at either end of cavity 304, xm and xn, as well as at the center of the cavity, xc. In the depicted example, cavity lengths L(xm), L(xc), and L(xn) are equal to 3.7, 4.7, and 5.7 microns, respectively.

FIGS. 9A-H depict comparisons of transmission spectra for different sample materials as measured by a conventional FTIR system and a spectrometer in accordance with the present disclosure.

Plots 900A-D show transmission spectra for glucose, acetaminophen, polystyrene, and low-density polyethylene, respectively, measured using a conventional FTIR system.

Plots 900E-H show transmission spectra for glucose, acetaminophen, polystyrene, and low-density polyethylene, respectively, measured using a spectrometer analogous to spectrometer 100.

As evinced by plots 900A-H, the performance of spectrometer 100 is comparable to that of a more expensive, more complex, and larger FTIR system. In addition, each of the measurements taken with spectrometer 100 were obtained in less than one second markedly faster than can be achieved using conventional FTIR systems.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A spectrometer (100) for analyzing a sample (110), the spectrometer being configured for operation in the mid-infrared spectral range, and the spectrometer comprising:
    a source (102) that provides a source signal (112) having a first spectral range (SR1) that includes a plurality of wavelength signals ($\lambda 1$-$\lambda n$), wherein each wavelength signal of the plurality thereof is characterized by a different wavelength;
    a spectral filter (104) that receives the source signal at a first surface (116-1) and provides at least a portion of the source signal as an interrogation signal (114) at a filter aperture (118) included in a second surface (116-2), wherein the interrogation signal has a second spectral range (SR2) that includes the plurality of wavelength signals, the second spectral range being within the mid-infrared spectral range, and wherein the plurality of wavelength signals is dispersed along a first direction at the filter aperture; and
    a camera (106) that includes a lens (124) and a plurality of detector elements (130), wherein the camera is operative for providing an output signal (136) based on light incident on the plurality of detector elements;
    wherein the camera and spectral filter are arranged such that the camera images the filter aperture through the sample and forms an image (118') of the filter aperture that is focused on the plurality of detector elements such that each detector element receives a different image-portion (132) of the image.

2. The spectrometer of claim 1 wherein the spectral filter includes a first mirror (302-1) and a second mirror (302-2) that collectively define an optical cavity (304) having a cavity length (L(x)) that changes linearly along the first direction, and wherein each of the first and second mirrors is a multilayer Bragg reflector comprising at least one Bragg-layer-pair that includes a first layer (308) of a first material that has a first refractive index and a second layer (310) of a second material that has a second refractive index that is lower than the first refractive index.

3. The spectrometer of claim 2 wherein the first material comprises a material selected from the group consisting of silicon and germanium and the second material is air.

4. The spectrometer of claim 1 wherein the lens has a first focal length that defines a first object distance (128), and wherein the spectral filter and camera are arranged such that the filter aperture is located at the first object distance.

5. The spectrometer of claim 1 further comprising a processor (108) for estimating a chemical composition of the sample based on the output signal.

6. The spectrometer of claim 1 wherein each detector element of the plurality thereof comprises a bolometer that is operative for detecting light within the second spectral range.

7. The spectrometer of claim 6 wherein each bolometer is characterized by an operational spectral range that is larger than the second spectral range.

8. The spectrometer of claim 1 wherein the spectral filter includes a first mirror (302-1) and a second mirror (302-2) that are arranged such that they define a first angle ($\Phi$) along the first direction to collectively define an optical cavity (304) having a cavity length (L(x)) that changes linearly along the first direction, and wherein at least one of the cavity length and first angle is controllable.

9. The spectrometer of claim 1 wherein the spectral filter includes a first mirror (302-1) and a second mirror (302-2) that are arranged such that they define a first angle ($\Phi$) along the first direction and a second angle along a second direction that is orthogonal to the first direction, and wherein the plurality of wavelength signals is dispersed along the first and second directions at the filter aperture.

10. The spectrometer of claim 9 wherein at least one of the cavity length, the first angle, and the second angle is controllable.

11. A mid-infrared (MIR) spectrometer (100) for analyzing a sample (110), the spectrometer comprising:
    a source (102) that provides a source signal (112) having a first spectral range (SR1) that includes a plurality of wavelength signals ($\lambda 1$-$\lambda n$), each of the plurality of wavelength signals being within the MIR spectral range, wherein each wavelength signal of the plurality thereof is characterized by a different wavelength;
    a spectral filter (104) that receives the source signal at a first surface (116-1) and provides at least a portion of the source signal as an interrogation signal (114) at a filter aperture (118) included in a second surface (116-2), the interrogation signal having a second spectral range (SR2) that includes the plurality of wavelength signals, wherein the plurality of wavelength signals is dispersed along a first direction at the filter aperture; and
    a camera (106) that includes a plurality of detector elements (130) and a lens (124) having a focal length (f1) that defines an object distance (128), wherein the camera is operative for providing an output signal (136) based on light incident on the plurality of detector elements;
    wherein the camera and spectral filter are arranged such that the filter aperture is located at the object distance, and wherein the sample is between the lens and the spectral filter.

12. The MIR spectrometer of claim 11 wherein the spectral filter includes a first mirror (302-1) and a second mirror (302-2) that are arranged such that they define a first angle ($\Phi$) along the first direction and a second angle along a second direction that is orthogonal to the first direction, and wherein the plurality of wavelength signals is dispersed along the first and second directions at the filter aperture.

13. The MIR spectrometer of claim 12 wherein at least one of the cavity length, the first angle, and the second angle is controllable.

14. The MIR spectrometer of claim 11 wherein the spectral filter includes:
- a first mirror (302-1) comprising a first Bragg reflector that includes at least one Bragg-layer-pair (312) having a first layer (308) that comprises a first material and a second layer (310) that comprises air, wherein the first material has a refractive index that is greater than that of air; and
- a second mirror (302-1) comprising a second Bragg reflector that includes at least one Bragg-layer-pair having the first and second layers, wherein the second mirror includes the filter aperture;
- wherein the first and second mirror are arranged such that they define a first angle ($\Phi$) along the first direction, and wherein the first angle is a non-zero angle, and
- wherein the first and second mirrors are separated by a cavity length (L(x)) that changes linearly along the first direction.

15. The MIR spectrometer of claim 14 wherein at least one of the cavity length and the first angle is controllable.

16. The MIR spectrometer of claim 11 further comprising a processor (108) for estimating a chemical composition for the sample based on the output signal.

17. The MIR spectrometer of claim 11 wherein the camera and spectral filter are arranged such that the camera images the filter aperture through the sample and focuses an image (118') of the filter aperture on the plurality of detector elements such that each detector element receives a different image portion (132) of the image.

18. A method for analyzing a sample (110), the method including:
- providing an interrogation signal (114) at a filter aperture (118) of a spectral filter (104), wherein the interrogation signal includes a plurality of wavelength signals ($\lambda 1$-$\lambda n$) that are dispersed along a first direction at the filter aperture, and wherein the plurality of wavelength signals are within the mid-infrared spectral range;
- imaging the filter aperture through the sample to form an image (118') that is focused at a focal-plane array (122) comprising a plurality of detector elements (130), wherein the image is based on the interrogation signal and an absorption spectrum of the sample, and wherein each detector element receives a different image-portion (132) of the image and provides a detector output (134) that is based on the intensity of the image-portion it receives; and
- providing an output signal (136) that includes the plurality of detector outputs.

19. The method of claim 18 further including estimating a chemical composition of the sample based on the output signal.

20. The method of claim 18 further including providing the spectral filter such that it includes a first mirror (302-1) and a second mirror (302-2) that collectively define an optical cavity (304) having a cavity length (L(x)) that changes linearly along the first direction, and wherein each of the first and second mirrors is a multilayer Bragg reflector comprising at least one Bragg-layer-pair that includes a first layer (308) of a first material that has a first refractive index and a second layer (310) of a second material that has a second refractive index that is lower than the first refractive index.

21. The method of claim 20 wherein the spectral filter is provided such that the first material comprises a material selected from the group consisting of silicon and germanium and the second material is air.

22. The method of claim 20 further comprising:
- providing a camera (106) for imaging the filter aperture through the sample, wherein the camera includes a lens (124) and the plurality of detector elements, and wherein the lens has a focal length (f1) that defines an object distance (128); and
- locating the spectral filter such that the filter aperture is located at the object distance.

23. The method of claim 22, wherein the interrogation signal has a first spectral range, and wherein each detector element of the plurality thereof comprises a bolometer that is characterized by an operational spectral range that is larger than the first spectral range and includes the first spectral range.

24. The method of claim 20 further comprising:
- providing the spectral filter such that the first and second mirrors are arranged such that they define a first angle ($\Phi$) along the first direction; and
- controlling at least one of the cavity length and the first angle.

25. The method of claim 20 further comprising:
- providing the spectral filter such that the first and second mirrors are arranged such that they define a first angle ($\Phi$) along the first direction and a second angle along a second direction that is orthogonal to the first direction, and wherein the plurality of wavelength signals is dispersed along the first and second directions at the filter aperture.

26. The method of claim 25 further comprising controlling at least one of the cavity length, the first angle, and the second angle.

* * * * *